US011826656B2

(12) United States Patent
Kazama

(10) Patent No.: US 11,826,656 B2
(45) Date of Patent: *Nov. 28, 2023

(54) LATENCY COMPENSATION FOR INTERFACE TYPE IN EMULATION

(71) Applicant: Sony Interactive Entertainment Inc., Tokyo (JP)

(72) Inventor: Takayuki Kazama, Foster City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 60 days.

This patent is subject to a terminal disclaimer.

(21) Appl. No.: 17/538,143

(22) Filed: Nov. 30, 2021

(65) Prior Publication Data

US 2022/0088490 A1  Mar. 24, 2022

Related U.S. Application Data

(63) Continuation of application No. 14/196,171, filed on Mar. 4, 2014, now Pat. No. 11,185,783.

(60) Provisional application No. 61/784,437, filed on Mar. 14, 2013.

(51) Int. Cl.
*A63F 13/42* (2014.01)
*A63F 13/77* (2014.01)
*A63F 13/355* (2014.01)
*A63F 13/53* (2014.01)

(52) U.S. Cl.
CPC ............ *A63F 13/77* (2014.09); *A63F 13/355* (2014.09); *A63F 13/42* (2014.09); *A63F 13/53* (2014.09)

(58) Field of Classification Search
CPC ........ A63F 13/77; A63F 13/355; A63F 13/42; A63F 13/53
USPC .......................................................... 463/31
See application file for complete search history.

(56) References Cited

U.S. PATENT DOCUMENTS

| 7,338,376 | B2 | 3/2008 | Eck et al. |
| 2001/0029205 | A1 | 10/2001 | Taho et al. |
| 2002/0142843 | A1 | 10/2002 | Roelofs |
| 2004/0179019 | A1 | 9/2004 | Sabella et al. |
| 2005/0261062 | A1 | 11/2005 | Ewin et al. |

(Continued)

OTHER PUBLICATIONS

Final Office Action for U.S. Appl. No. 14/196, 171, dated Mar. 11, 2021.

(Continued)

*Primary Examiner* — Jay Trent Liddle
*Assistant Examiner* — Ryan Hsu
(74) *Attorney, Agent, or Firm* — JDI PATENT; Joshua D. Isenberg; Robert Pullman

(57) ABSTRACT

A server may determine a client device type from an identifier and generate a user interface configuration profile for the client device using the client device type. The client device can use the profile to configure a first user interface to provide inputs for a software title emulated by the server. The software title is configured for use with a device having a second user interface. The server sends the profile to the client device and emulates the software title with inputs received from the client device. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

12 Claims, 2 Drawing Sheets

(56) References Cited

U.S. PATENT DOCUMENTS

| | | | |
|---|---|---|---|
| 2006/0046819 | A1 | 3/2006 | Nguyen et al. |
| 2006/0160626 | A1 | 7/2006 | Gatto et al. |
| 2007/0026923 | A1 | 2/2007 | Muir |
| 2008/0182668 | A1 | 7/2008 | Tominaga et al. |
| 2009/0217307 | A1 | 8/2009 | Ooe |
| 2009/0303245 | A1 | 12/2009 | Soupikov et al. |
| 2009/0305790 | A1 | 12/2009 | Lu et al. |
| 2010/0273557 | A1 | 10/2010 | Miyaki |
| 2011/0299105 | A1 | 12/2011 | Morrison et al. |
| 2012/0158883 | A1 | 6/2012 | Ikenaga |
| 2012/0221318 | A1 | 8/2012 | Shimizu et al. |
| 2013/0150161 | A1 | 6/2013 | Kruglick |
| 2013/0151655 | A1 | 6/2013 | Wu et al. |
| 2014/0092087 | A1 | 4/2014 | Kazama et al. |
| 2014/0094299 | A1 | 4/2014 | Stine et al. |
| 2014/0094315 | A1 | 4/2014 | Stine et al. |

OTHER PUBLICATIONS

Final Office Action for U.S. Appl. No. 14/196, 171, dated May 7, 2019.

Ilya Grigorik, "Primer on Latency and Bandwidth" High Performance Browser Networking 2013 accessed Jun. 9, 2020, available at: https://hpbn.co/primer-on-latency-and-bandwidth/#speed-is-a-feature).

MAME Device Basics, MAMEDEV Wiki, published Dec. 8, 2014 as evidenced from retrieved from Internet Wayback Machine on 11811 7 from Internet URL chttp:llwiki.mamedev.org/index.php/MAME~Device~Basic.

Non-Final Office Action for U.S. Appl. No. 14/196,171, dated Mar. 9, 2018.

Non-Final Office Action for U.S. Appl. No. 14/196,171, dated Oct. 23, 2018.

Non-Final Office Action for U.S. Appl. No. 14/196,171, dated Oct. 3, 2020.

Non-Final Office Action for U.S. Appl. No. 14/196,171, dated Sep. 17, 2019.

Non-Final/Final Office Action for U.S. Appl. No. 14/196,171, dated May 3, 2020.

Notice of Allowance for U.S. Appl. No. 14/196,171, dated Jul. 30, 2021.

U.S. Appl. No. 61/784,437, to Takayuki Kazama, filed Mar. 14, 2013.

Zander et al., "Achieving Fairness in Multiplayer Network Games Through Automated Latency Balancing", International Conference on Advances in Computer Entertainment Technology, Jun. 15, 2005, ACE 2005, Valencia, Spain, p. 117-124. (Year 2005).

LATENCY COMPENSATION FOR INTERFACE TYPE IN EMULATION

CLAIM OF PRIORITY

This application is a continuation of Pending U.S. Non-Provisional application Ser. No. 14/196,171 which claims the priority benefit of U.S. Provisional Patent Application No. 61/784,437, filed Mar. 14, 2013, the entire disclosures of which are incorporated herein by reference.

BACKGROUND

In cloud gaming, a server emulates the operation of a gaming device for a remote client. The server and client are separated. Client device sends controller data to server, which processes the data and sends a result.

Gaming devices have different controllers depending on the type of device. The game server doesn't necessarily know what type of controller the client is using and this may detrimentally affect the emulation. For example, a certain type of portable game device may have a unique interface feature, e.g., a backside touch pad and no other controller has such a feature. A cloud server may emulate a game originally written for this type of portable game device for a client device. However, the client device might not be the specific device that has the backside touch pad. In such a case, the cloud server would have to somehow provide the client device with the equivalent functionality of the portable game device that has the backside touch pad.

Recent generations of game controllers include some sort of screen and a touch panel. Cloud servers will need to somehow emulate the touch panel functionality on the client side for client devices that lack such controller features. For a personal computer (PC) one can emulate the controller using a specific hardware emulator configured to emulate a specific client device. However, the PC might not have the hardware emulator.

The use of cloud-based emulation presents many challenges. Users are likely to access emulated software using a wide variety of different client devices. For example, currently, users can change size and placement of the user interface (UI) on a cell phone screen, when a game console is emulated on smart phone. However, users may not want to have to change the UI configuration themselves.

It is within this context that aspects of the present disclosure arise.

DESCRIPTION

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

According to aspects of the present disclosure, a server may obtain information about what functionality the client device has. The server may use this information to generate a user interface (UI) configuration profile for the particular client device. In general, when a client device connects to a server to play a game the server can find out what type of device the client is. The server may then use this information to generate a user interface configuration profile that it sends to the client device. The client device uses the profile to configure its user interface for playing a game being emulated on the server.

According to certain aspects of the present disclosure a server may suggest a best way to configure the client device interface if the server has sufficient information about the game and how people play it.

The server could provide such a UI configuration profile to the user community (e.g., via bulletin boards). Users could share UI configuration profiles the same way.

Figure 1:
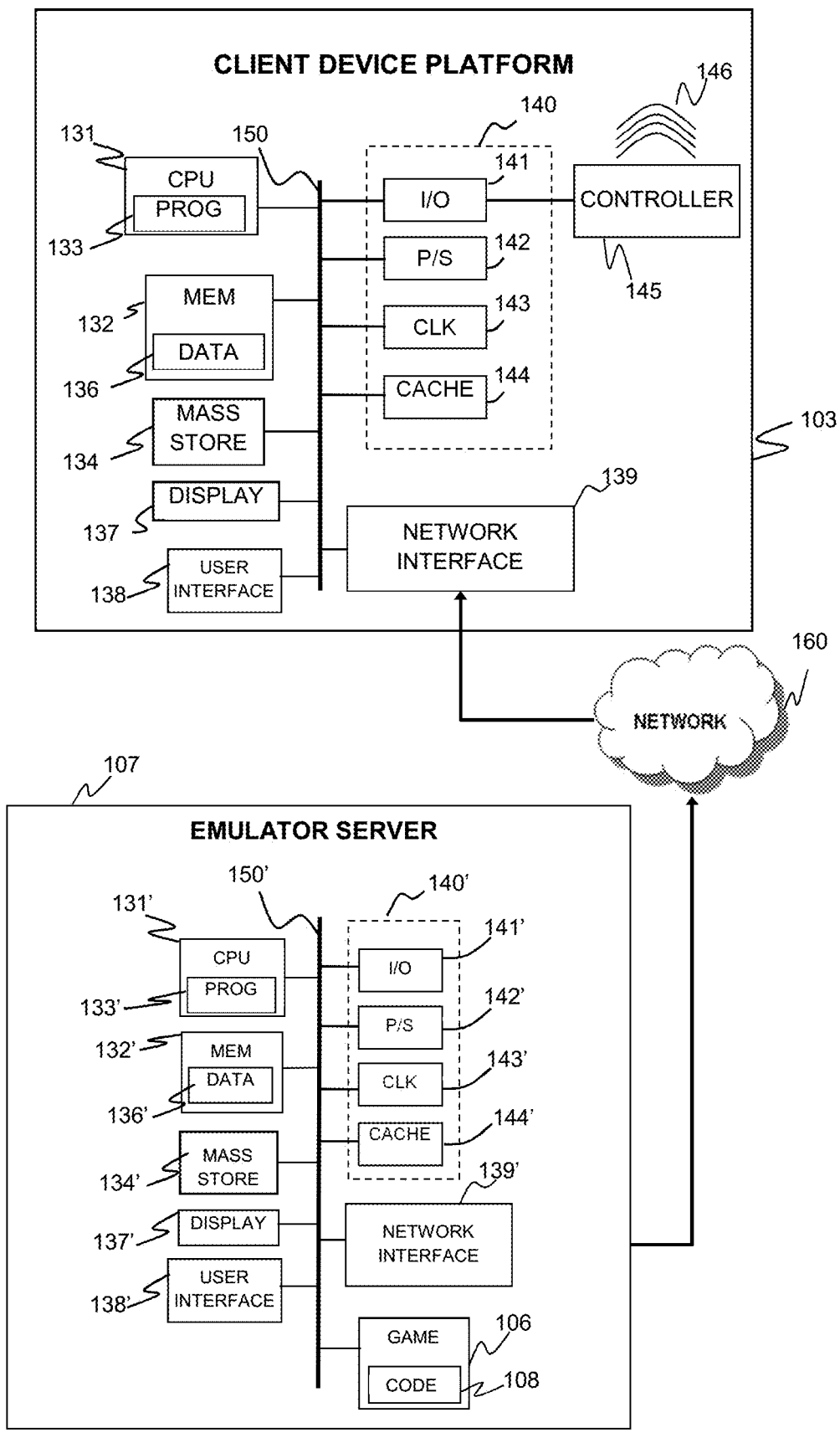
FIG. 1 is a schematic diagram of a client device platform and an emulator server communicating over a network according to an aspect of the present disclosure.

To put certain aspects of the present disclosure into context it is useful to understand emulation of a game on a server. FIG. 1 is a schematic diagram illustrating a system containing components that can implement controller emulation in accordance with aspects of the present disclosure. An emulator server 107 may be accessed by a client device platform 103 over a network 160. The client device platform 103 may access alternative emulators 107 over the network 160. The emulators 107 may be identical to each other, or they may each be programed to emulate unique legacy game titles 106 or unique sets of legacy game titles 106. Furthermore, other client devices (not shown) may communicate with the client device 103 and/or access the emulator server 107 via the network 160.

The client device platform 103 may include a central processor unit (CPU) 131. By way of example, a CPU 131 may include one or more processors, which may be configured according to any suitable processor architecture, e.g., a dual-core, quad-core, multi-core, or Cell processor architecture. The client device platform 103 may also include a memory 132 (e.g., RAM, DRAM, ROM, and the like). The CPU 131 may execute a process-control program 133, portions of which may be stored in the memory 132. The client device platform 103 may also include well-known support circuits 140, such as input/output (I/O) circuits 141, power supplies (P/S) 142, a clock (CLK) 143 and cache 144. The client device platform 103 may optionally include a mass storage device 134 such as a disk drive, CD-ROM drive, tape drive, or the like to store programs and/or data. The client device platform 103 may also optionally include a display unit 137 and a user interface unit 138 to facilitate interaction between the client device platform 103 and a user. The display unit 137 may be in the form of a cathode ray tube (CRT) or flat panel screen that displays text, numerals, or graphical symbols. The user interface unit 138 may include a keyboard, mouse, joystick, light pen, or other device. A controller 145 may be connected to the client device platform 103 through the I/O circuit 141 or it may be directly integrated into the client device platform 103. The controller 145 may facilitate interaction between the client device platform 103 and a user. The controller 145 may include a keyboard, mouse, joystick, light pen, hand-held controls or other device. The controller 145 may also be capable of generating a haptic response 146. By way of example and not by way of limitation, the haptic response 146 may be implemented in the form of mechanical vibrations or any other feedback corresponding to the sense of touch. The client device platform 103 may include a network interface 139, configured to enable the use of Wi-Fi, an Ethernet port, or other communication methods.

The network interface 139 may incorporate suitable hardware, software, firmware or some combination of two or more of these to facilitate communication via an electronic communications network 160. The network interface 139 may be configured to implement wired or wireless communication over local area networks and wide area networks such as the Internet. The client device platform 103 may send and receive data and/or requests for files via one or more data packets over the network 160.

The preceding components may exchange signals with each other via an internal system bus 150. The client device platform 103 may be a general purpose computer that becomes a special purpose computer when running code that implements embodiments of the present invention as described herein.

The emulator 107 may include a central processor unit (CPU) 131'. By way of example, a CPU 131' may include one or more processors, which may be configured according to any suitable processor architecture, e.g., a dual-core, quad-core, multi-core, or Cell processor architecture. The emulator 107 may also include a memory 132' (e.g., RAM, DRAM, ROM, and the like). The CPU 131' may execute a process-control program 133', portions of which may be stored in the memory 132'. The emulator 107 may also include well-known support circuits 140', such as input/output (I/O) circuits 141', power supplies (P/S) 142', a clock (CLK) 143' and cache 144'. The emulator 107 may optionally include a mass storage device 134' such as a disk drive, CD-ROM drive, tape drive, or the like to store programs and/or data. The emulator 107 may also optionally include a display unit 137' and user interface unit 138' to facilitate interaction between the emulator 107 and a user who requires direct access to the emulator 107. By way of example and not by way of limitation a client device platform or engineer 103 may need direct access to the emulator 107 in order to program the emulator 107 to properly emulate a desired legacy game 106 or to add additional mini-game capabilities to a legacy game 106. The display unit 137' may be in the form of a cathode ray tube (CRT) or flat panel screen that displays text, numerals, or graphical symbols. The user interface unit 138' may include a keyboard, touchpad, touch screen, mouse, joystick, light pen, or other device. The emulator 107 may include a network interface 139', configured to enable the use of Wi-Fi, an Ethernet port, or other communication methods.

The network interface 139' may incorporate suitable hardware, software, firmware or some combination of two or more of these to facilitate communication via the electronic communications network 160. The network interface 139' may be configured to implement wired or wireless communication over local area networks and wide area networks such as the Internet. The emulator server 107 may send and receive data and/or requests for files via one or more data packets over the network 160.

The preceding components may exchange signals with each other via an internal system bus 150'. The emulator server 107 may be a general purpose computer that becomes a special purpose computer when running code that implements embodiments of the present invention as described herein.

The emulator server 107 may access a legacy game 106 that has been selected by the client device platform 103 for emulation through the internal system bus 150'. There may be more than one legacy game 106 stored in the emulator. The legacy games may also be stored in the memory 132' or in the mass storage device 134'. Additionally, one or more legacy games 106 may be stored at a remote location accessible to the emulator server 107 over the network 160. Each legacy game 106 contains game code 108. When the legacy game 106 is emulated, the game code 108 produces legacy game data 109. Legacy game data 109 may be received by the client device platform 103 and displayed on the display unit 137.

By way of example, a legacy game 106 may be any game that is not compatible with a client device platform 103. By way of example and not by way of limitation, the legacy game 106 may have been designed to be played on Sony Computer Entertainment's PlayStation Vita portable gaming device having, among other things, a touch screen, back touch interface, inertial sensor and analog joysticks, but the client device platform 103 is a home computer having a screen, keyboard, and mouse.

Figure 2:
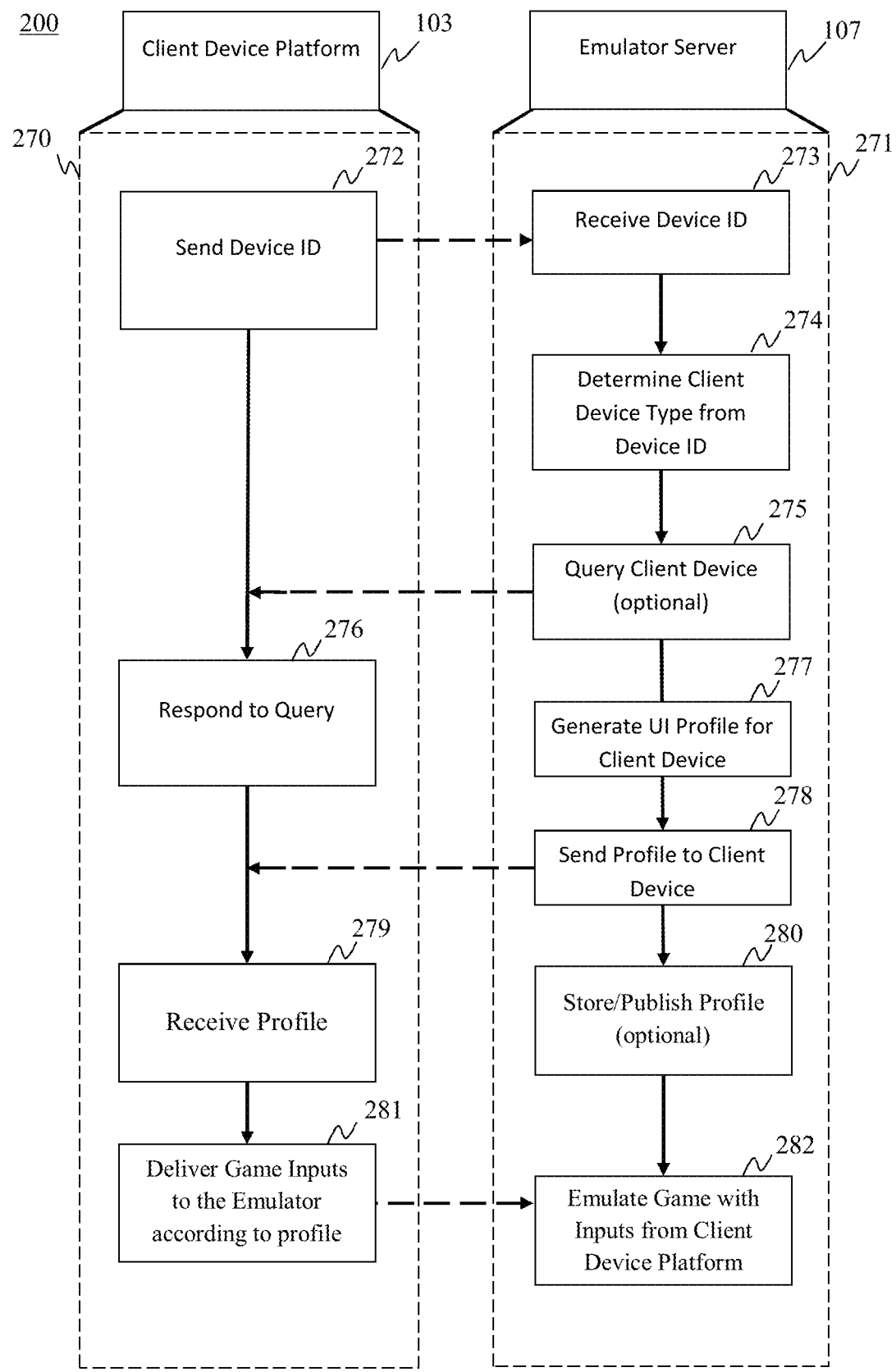
FIG. 2 is a flow diagram illustrating a method of emulating a controller for an emulated game according to an aspect of the present disclosure.

As shown in FIG. 2A, the emulator server 107 may be configured to implement a method for controller emulation while emulating a legacy game 106 according to an inventive method 200. Various aspects of the method 200 may be implemented by execution of computer executable instructions running on the client device platform 103 and/or the emulator 107 in conjunction with the actions of a client device platform 103. Specifically, a client device platform 103 may be configured, e.g., by suitable programming, to implement certain client device platform instructions 270, which may be part of the program 133 executed by the CPU 131 of the client device 103. In addition, the emulator 107 server may be configured to implement certain emulator instructions 271, which may be part of the program 133' executed by the CPU 131' of the emulator server 107. In FIG. 2A the dashed arrows represent the flow of data between the client device platform 103 and the emulator 107 over the network 160.

After logging in to the server 107 (or as part of the log in), the client device platform 103 sends a device ID to the server, as indicated at 272. The server receives the device ID as indicated at 273. The server 107 may then determine what type of device the client device 103 is from the device ID as indicated at 274. Specifically, each device ID may have an associated device type stored in a database, which can be stored in the server's memory 132' as part of the data 136'. The server 107 can use the program 133' to do a lookup in the database to determine the device ID for the device type sent from the client device 103. Device types may include, but are not limited to, personal computers, laptop computers, game console devices, portable game devices, cellular phones, smart phones, tablet computers, personal digital assistants, and the like. The server's database may include generic profiles for a PC, laptop, cellphone, tablet or other devices.

By way of example, and not by way of limitation, the database may include information as shown in Table I below.

TABLE I

| Device ID | Device Type | Screen | Keyboard | Mouse | Joystick | Touch screen | Touch Pad | Camera | Microphone |
|---|---|---|---|---|---|---|---|---|---|
| 1 | PC | Yes | Yes | Yes | No | No | No | maybe | Maybe |
| 2 | Laptop | Yes | Yes | No | No | No | Yes | yes | Yes |
| 3 | Smartphone | Yes | No | No | No | Yes | No | yes | Yes |
| 4 | Tablet | Yes | No | No | No | Yes | No | Yes | Yes |

TABLE I-continued

| Device ID | Device Type | Screen | Keyboard | Mouse | Joystick | Touch screen | Touch Pad | Camera | Microphone |
|---|---|---|---|---|---|---|---|---|---|
| 5 | Game console | Yes | No | No | Yes | Yes | No | maybe | Maybe |
| 6 | Portable game device | Yes | No | No | Yes | Yes | No | Yes | Yes |

The server 107 may generate a UI configuration profile for each device based on the combination of generic device UI features and additional information, which may be provided by a user or the client device itself. The UI configuration profile may include code and or data that maps inputs from the client device to inputs from the device being emulated by the server. The UI configuration profile may also include information that can be presented to the user in the form of text or images. The information can explain to the user how to use the input devices on the client device to play the game being emulated.

In some cases, the database might not have all of the features a given device has. However, if the device type is known, it is possible for the server 107 to estimate what UI features the client device 103 can be expected to have. For example, a PC can be expected to have a screen, keyboard and mouse, but not necessarily have a joystick camera or microphone. The server 107 could set up an initial UI profile for a PC based on the assumed features of screen, keyboard and mouse. In some implementations, the server could optionally query the client device (or the user), as indicated at 275 to determine whether the client device has certain features that are not standard but possible for that type of device. For example, if a user accesses the server using a PC, the server could query the PC to determine if it has a camera or microphone. Alternatively, the server could send a message that can be read by the user asking for this information. The server could also query the PC (or user) to determine if it has the standard assumed features (e.g., screen, keyboard and mouse). The client device or user may respond as indicated at 276. The server 107 may then generate the UI configuration profile as indicated at 277 using the standard assumed features and any additional information in the response.

The server 107 may need to obtain additional information from the client device or user even if certain UI capabilities are verified in response to the query or from the device ID. For example, the client device 103 might have a camera, but the camera might not be ideal for running games that use a specific type of camera or other interface. The server 107 may generate a profile for the client device 103 that takes into account differences between the capabilities of the client device and the controller interface being emulated. By way of example, the PlayStation Eye camera has certain image resolution and zoom capabilities and a microphone array for object tracking. The Kinect interface uses a camera that can swivel and also includes an infrared laser and sensor for depth sensing. The client device user interface 138 may include a camera might not have such capabilities.

The server 107 can use the information about the client device's UI capabilities to generate a best fit UI configuration profile for emulating a given controller functionality with a particular client device. By way of example, and not by way of limitation, the user interface 138 on the client device 103 may include a keyboard. The client device program 133 may include a key assignment program. The server 107 could generate a best fit key assignment that can be included in the UI configuration profile for the client device 103.

In extreme cases, the server 107 could restrict use of or access to a game if the device doesn't have sufficient functionality. This feature could help avoid a situation where a user pays for a game that he can't play on the device that he has.

Once the UI configuration profile has been generated the server may send it to the client device 103 as indicated at 278. The user receives the profile, as indicated at 279 and may use it to configure the client device user interface 138 for use in playing the game over the network 160 with the server 107 emulating the game. Specifically, the client device 103 may generate game inputs in response to user input on the user interface 138 according to the profile. These inputs can be delivered to the server 107, as indicated at 281. The server may then emulate the game title using the inputs received from the client device 103 as indicated at 282.

In some implementations, the user may be able to customize the profile from the server 107 to emulate the controller functionality. In particular, the user may use the client device to modify the UI configuration profile to produce a modified profile. The client device 103 may then configure the user interface 138 using the modified profile. By way of example, and not by way of limitation, the user may be using a tablet computer with a touch screen but no back touch to emulate a portable game device having a touch screen and a back touch. The UI configuration profile generated by the server 107 could designate part of the tablet touch screen to perform the function of the back touch on the portable game device. The program 133 on the client device 103 could allow the user to change the assignment of the back touch area to a different part of the tablet's touch screen than the one designated by the server 107.

In some implementations, the server 107 may store the UI configuration profile in the server memory 132' for future reference, as indicated at 280. In other implementations, the server 107 may publish the UI configuration profile, e.g., to a social media page, as also indicated at 280. Publishing the profile allows other users with similarly configured client devices to access the profile to facilitate interaction with the server 107 during emulation. If a client device already has a stored profile, the client device may include this information along with the client device ID at 272. Also, publishing UI configuration profiles allows users to provide feedback through the social media page.

According to certain aspects of the present disclosure, the server 107 could handicap the latency or ease of using the client device UI 138 during emulation at 282. This can be particularly useful, e.g., when two or more users are playing each other on different types of client device with different types of UI. There are a number of different ways in which the server may handicap the latency for a given client device 103 with a given user interface 138. For example, the server may add latency for a first client device having a controller that is standard for a given title being emulated and add less latency or no latency to a second client device having a non-standard controller for the title being emulated. There may be different latencies or a user may have an advantage with one type of controller. The server 107 could collect data from users during gameplay on different devices and compare quality of play for users with different devices to determine the amount of latency handicap to apply to a given type of client device with a given type of user interface.

Alternatively, the server 107 could change a scoring metric for an emulated game based on the type of client device being used. For example, suppose game being emulated uses a particular type of controller on a specific type of game console. If the client device is the specific game console and uses the specific type of controller, the game scoring may be weighted with a weight of one. If the client device 103 is different than from the specific game console, the server 107 may apply a weight greater to the scoring as part of emulating the game or as part of the UI configuration profile. The weight may the degree of difficulty of using the client device interface 138 with the emulated game. The server 107 may collect data from users during gameplay on different devices and compare quality of play for users with different devices to determine the amount of weight to apply to scoring for a given type of client device with a given type of user interface.

Aspects of the present disclosure facilitate remote emulation of various types of software titles for client devices that have a different user interface than the software title would normally use. This can enhance the user experience with the emulated title. It is noted that although various aspects are described herein with respect to game titles, the concepts described herein can be extended to other types of software that is remotely emulated.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

The invention claimed is:

1. A method implemented by a server, comprising:
receiving a device identifier from a client device having a first user interface;
determining a client device type for the client device from the identifier;
generating a user interface configuration profile for the client device using the client device type, wherein the user interface configuration profile is usable by the client device to configure the first user interface to provide inputs for a software title being implemented by the server, wherein the software title being implemented by the server is configured for use with a device having a second user interface;
sending the user interface configuration profile to the client device; and
implementing the software title with inputs received from the client device wherein implementing the software title with inputs received from the client device includes adjusting a latency for the client device wherein an amount of latency adjustment depends on an interface type for the first user interface and wherein the amount of latency adjustment depends on features of the first user interface wherein a type of the first user interface is one of a camera, light pen, keyboard, mouse, microphone, touch screen, touch pad, joystick, and game controller.

2. The method of claim 1, wherein the inputs received from the client device are generated in accordance with the user interface configuration profile.

3. The method of claim 1, further comprising querying the client device in response to determining the client device type from the identifier.

4. The method of claim 1, further comprising storing or publishing the user interface configuration profile.

5. The method of claim 1, wherein the first and second user interfaces are different.

6. The method of claim 1, wherein the software title is a game title.

7. The method of claim 6, wherein the client device is being used to play the game title against a different client device having a second user interface that is different from the first user interface and wherein the server adjusts the latency for the client device differently than for the different client device.

8. The method of claim 1, wherein the software title is a game title and wherein implementing the software title with inputs received from the client device includes adjusting a scoring for the client device wherein an amount of scoring adjustment depends on an interface type for the first user interface.

9. The method of claim 8, wherein the client device is being used to play the game title against a different client device having a second user interface that is different from the first user interface and wherein the server adjusts the scoring for the client device differently than for the different client device.

10. The method of claim 1 wherein the client device is a PC, a laptop, a cellphone, a tablet, a game console or a portable game console.

11. A non-transitory computer-readable medium having computer executable instructions embodied therein, the instructions being configured to implement a method, the method comprising:
receiving a device identifier from a client device having a first user interface;
determining a client device type for the client device from the identifier; generating a user interface configuration profile for the client device using the client device type, wherein the user interface configuration profile is usable by the client device to configure the first user interface to provide inputs for a software title being implemented by a server, wherein the software title being implemented by the server is configured for use with a device having a second user interface;
sending the user interface configuration profile to the client device; and
implementing the software title with inputs received from the client device wherein implementing the software title with inputs received from the client device includes adjusting a latency for the client device wherein an amount of latency adjustment depends on an interface type for the first user interface and wherein the amount of latency adjustment depends on features of the first user interface wherein a type of the first user interface is one of a camera, light pen, keyboard, mouse, microphone, touch screen, touch pad, joystick, and game controller.

12. A system, comprising:

a processor;

a memory; and one or more instructions embodied in the memory, the instructions being operable to implement a method, the method comprising:

receiving a device identifier from a client device having a first user interface;

determining a client device type for the client device from the identifier;

generating a user interface configuration profile for the client device using the client device type, wherein the user interface configuration profile is usable by the client device to configure the first user interface to provide inputs for a software title being implemented by the system, wherein the software title being implemented by the system is configured for use with a device having a second user interface;

sending the user interface configuration profile to the client device; and implementing the software title with inputs received from the client device wherein implementing the software title with inputs received from the client device includes adjusting a latency for the client device wherein an amount of latency adjustment depends on an interface type for the first user interface and wherein the amount of latency adjustment depends on a features of the first user interface wherein a type of the first user interface is one of a camera, light pen, keyboard, mouse, microphone, touch screen, touch pad, joystick, and game controller.

\* \* \* \* \*